INVENTOR.
E. W. TURNER

BY
*Young + Quigg*
ATTORNEYS

United States Patent Office 3,662,048
Patented May 9, 1972

3,662,048
CONTROL OF WALL THICKNESS OF IRREGULARLY SHAPED BLOW MOLDED ARTICLES
Edward W. Turner, Deerfield, Mass., assignor to
Phillips Petroleum Company
Filed Nov. 13, 1969, Ser. No. 876,496
Int. Cl. B29c 17/07
U.S. Cl. 264—85                                    12 Claims

ABSTRACT OF THE DISCLOSURE

Irregularly shaped blow molded articles such as bottles having a generally flat configuration are produced having a more uniform wall thickness by providing a thin film of gaseous fluid between an expanding parison and the first portion of the mold wall to be contacted and/or providing a gaseous fluid jet to cool the portion of the parison which is expanding toward the side walls at the ends of the longer axis of the mold.

BACKGROUND OF THE INVENTION

This invention relates to improved methods of blow molding hollow articles of irregular shape. While the blow molding art goes back over 100 years, it has only been in the last dozen years that blow molding of hollow plastic articles has achieved significant commercial success. Blow molding has traditionally been associated with the formation of bottles of a generally round configuration. In recent years, however, there have been efforts to expand the blow molding techniques to encompass the formation of more sophisticated moldings, including such diverse items as hollow beverage cases, having internal dividers, items having integrally molded handles, and the like. In any of these applications involving the fabrication of items which are not symmetrical, there is a problem encountered with regard to uniformity of the wall thickness of the finished article. It is a fairly simple matter to compensate for this with items which vary in diameter along a longitudinal axis thereof, for instance, a generally round bottle having a larger base portion; this can be done by "programming" the parison to produce a parison having an initial wall thickness which is comparatively large and which progressively decreases as the parison is extruded.

The formation of blow molded articles having a significant difference between the dimensions as measured across the major and minor axes perpendicular to the longitudinal axis, such as a generally flat bottle, present a more difficult problem. Also, there has recently been developed techniques whereby blow molded articles can be produced having biaxial orientation, which articles have exceptional strength and other highly desirable physical properties. This technique involves forming a parison, cooling it to well below the crystalline melting point and thereafter reheating it to orientation temperature which is just below the crystalline melting joint. The problems normally encountered in forming irregularly shaped blow molded articles are increased many fold when dealing with parisons at orientation temperature because the parison is already at a temperature just below its crystalline melting point at which temperature it is not easily expanded. Thus, when such a parison makes its initial contact with the mold walls, it is chilled yet further, and this portion does not continue to expand. For this reason, all of the remainder of the expansion must take place in the portion of the parison which has not yet touched the mold wall and this results in a great variation in wall thickness around the circumference of the article.

SUMMARY OF THE INVENTION

It is an object of this invention to provide irregularly shaped blow molded articles having wall sections of improved uniformity;

It is a further object of this invention to provide for the production of substantially flat blow molded bottles; and It is yet a further object of this invention to provide high strength biaxially oriented articles having an irregular shape.

In accordance with this invention, a thin film of gaseous fluid is provided between an expanding parison and the first portion of the mold wall to be contacted by said parison. In an alternative embodiment, a gaseous fluid jet is provided to cool the portion of the parison which is expanding toward the most distant side wall of the mold.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figure 1:
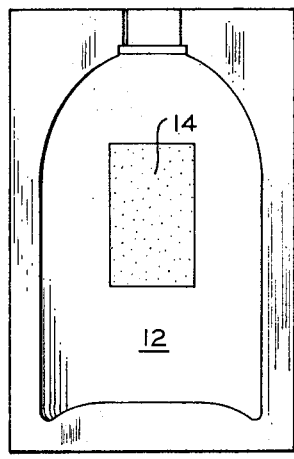
FIG. 1 is a side view of one mold half employing a means for providing a gaseous fluid bearing.

This invention is applicable for the formation of irregularly shaped blow molded articles such as bottles and other containers, toys, lamp shades, and the like.

The invention is applicable for the production of these articles from any plastic resin. In embodiments wherein the invention is utilized for the production of biaxially oriented articles, preferred resins include polymers and copolymers of mono-1-olefins having 2–8 carbon atoms per molecule, more preferably polymers and copolymers of ethylene, propylene, and 1-butene, with polypropylene being especially preferred.

In the embodiments relating to the formation of biaxially oriented articles, the thermoplastic is first extruded or molded into parison preforms and cooled to a temperature below the crystalline freezing point thereof. The parisons are then heated to orientation temperature which is generally about 1–50, preferably 5–25° F. below the crystalline melting temperature at which temperature the parison is first stretched axially and thereafter expanded by the introduction of internal fluid pressure to achieve circumferential orientation and to cause the parison to conform to the shape of the mold cavity. Techniques for forming biaxially oriented hollow articles are disclosed in Turner et al., U.S. 3,390,426, July 2, 1968, the disclosure of which is hereby incorporated by reference. The crystalline melt point can be determined by placing a small sample of the material to be tested on a heating stage of a polarizing microscope and recording the crystalline melting point as that temperature at which the last birefringence disappears on slow heating. The parison preforms can be reheated to this orientation temperature in an air oven, in a liquid bath, in a heating block, by subjecting them to radiant heat, or any other suitable means.

The gaseous fluid bearing or lubricating film on the mold walls at the ends of the minor diameter of the mold where the parison would touch first can be provided either by means of several small holes in the wall of the mold or else by the provision of a plate of porous material such as sintered metal. In instances where a porous plate is utilized, the plate can have a means pore diameter in the range of about 5–165, preferably 10–65, microns. In either event, there is provided only a small volume of gaseous fluid which is sufficient to provide a thin film which acts as a gaseous fluid bearing or lubricating surface between the parison and the mold wall. This prevents direct contact of the parison with the mold wall. In this way, that portion of the parison which would otherwise touch the mold wall first and thereafter cease stretching due to the cooling effect of the mold wall and the physical restraining effect of being in contact with the mold wall, can continue to expand so as to allow the entire circumference of the parison to expand relatively uniformly. The volume of gaseous fluid is not sufficient to deform the parison or to cool it significantly. Indeed, as already noted, the net effect is to cause it to cool less, because the film prevents direct contact between the metal wall of the mold and the parison. While only a small volume (for instance, 400–10,000, preferably 1000–4000 cc./min./in.$^2$ of porous mold wall surface) of gaseous fluid is provided between the wall surface at the ends of the minor axis and the expanding parison, there is preferably a relatively high pressure drop across the porous mold wall. As an example, the pressure drop across the porous mold wall section can be from 5 to 100 p.s.i., preferably 5 to 40 p.s.i.

In the alternate embodiment whereby gaseous fluid jets are utilized to contact the portion of the parison expanding toward the walls at the ends of the major axis of the mold, sufficient gaseous fluid is provided to effect a cooling of that portion of the parison. In this way, that portion of the parison which is expanding toward the furthermost dimension of the mold is cooled and thus resists stretching more. In this way, a greater amount of the material necessary for expansion of the parison into conformity with the mold comes from that portion of the parison which is expanded out against the sides of the mold wall at the ends of the minor axis. That is, the cooling effect of the air jets compensates for the cooling effect of contact with the mold wall to allow uniform expansion.

More preferably, the gaseous fluid jets are used in combination with the gaseous fluid bearing so as to cause that portion of the parison expanding toward the furthermost dimension of the mold to be more resistant to stretching than that portion which first approaches a mold wall surface. The net effect of this coupled with the fact that the portion expanding toward the furthermost portion of the mold has further to expand results in relatively uniform wall thickness throughout the resulting blow molded hollow article.

It was completely unexpected that the use of gaseous fluid film in contact with the portion of the parison expanding toward walls at the end of the minor axis would cause more expansion to occur in that region whereas the use of the gaseous fluid jet impinging against the portion of the parison expanding toward the walls at the ends of the major axis would cause less expansion to occur with the net result that a generally flat article of exceptional uniformity of wall thickness could be achieved, even in instances where the parison is at orientation temperature.

The gaseous fluid supplied to the air jets should be under sufficient pressure that it will issue from the jets at a velocity within the range of 50 ft./sec. to acoustic velocity or higher, preferably 500 ft./sec. to acoustic velocity for the particular gaseous fluid being used. A pressure of 5 to 100 p.s.i.g., preferably 10 to 30 p.s.i.g. is satisfactory.

Any gaseous fluid which does not react adversely with the parison can be utilized, both for the gaseous bearing and also for the gaseous fluid jets. Nitrogen or air, for instance, are preferred fluids. The gaseous fluid for the jets could comprise a refrigerant such as $CO_2$ if desired.

It is essential that the gaseous fluid to the porous plate and/or jets be started at essentially the same time as the blow air is introduced into the interior of the parison as uneven expansion of the parison will otherwise begin within a fraction of a second after the introduction of blow fluid. It is also essential that the mold be vented so that the gaseous fluid being utilized to lubricate and/or cool the parison can escape from within the mold; this can be done simply by providing a slight air gap along a portion of the parting line of the mold halves.

In addition to providing more uniform wall thickness, operation in accordance with the instant invention, by precluding the formation of thick sections, allows the entire blown article to cool more quickly, thus shortening the molding cycle. In addition, in the alternative embodiment of the invention wherein gaseous fluid jets are utilized to contact the portion of the parison expanding toward walls at the ends of the major axis, the net effect of a row of these jets on each side of the parison along its entire length is to provide a gaseous fluid curtain which tends to reduce the tendency of the parison to form an initial bubble at one place which is expanded out against the walls of the mold and which bubble progresses up and/or down the length of the parison until the entire parison is expanded. By the very nature of this operation, there is a tendency to form folds in the parison which show up as undesirable blemishes in the finished product. With the air curtain, however, the bubble initially forming expands out to contact the air curtain and that portion is then cooled slightly so that successive portions of the parison can expand out to this point prior to the time any portion of the parison expands out to contact the mold walls.

Referring now to the drawings, particularly FIG. 1, there is shown mold half 10 having generally oval shaped bottle-forming cavity 12. Porous metal insert plate 14 is disposed in the side wall of cavity 12.

Figure 2:
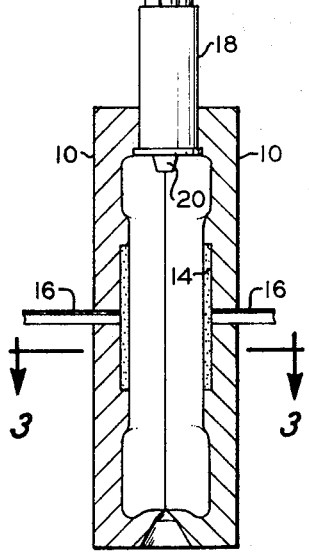
FIG. 2 is a cross section of a blow molding apparatus utilizing mold halves such as are shown in FIG. 1.

FIG. 2 shows two mold halves 10 in closed position preparatory to blow molding a parison (not shown). Gaseous fluid is passed to porous insert plate 14 via conduit 16. The parison is held at an upper end thereof by a thread-forming means comprising rotatable jaws 18 and plug 20.

Figure 3:
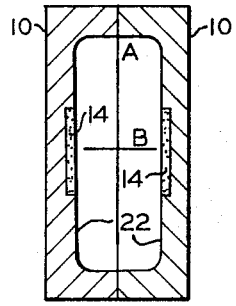
FIG. 3 is a view along section lines 3—3 of FIG. 2.
Figure 4:
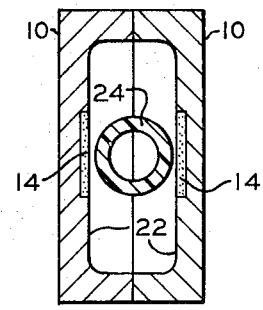
FIG. 4 is a view similar to FIG. 3 showing a parison in place.
Figure 5:
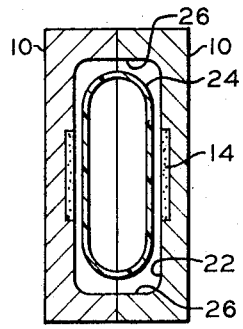
FIG. 5 is a view similar to FIG. 4 at a later stage in the operation.

FIGS. 3–5 shows in greater clarity the generally flat cross-sectional shape of the mold. As can be seen from FIG. 3, porous plates 14 are in mold wall 22 centered on the ends of minor axis B and extending over at least ¼ the width and ¼ the length of the wall. In FIG. 4, there is shown an arrangement identical to that in FIG. 3 with a parison 24 in place. As can be seen by comparing FIGS. 4 and 5, as fluid pressure is introduced into parison 24, the gaseous fluid films formed between the parison and plates 14 prevent the parison from coming into contact with mold wall 22 at the ends of minor axis B. This allows material to be drawn from this portion of the parison as it expands toward mold walls 26 at the ends of major axis A. It is readily apparent that the uniform wall thickness shown in the expanding parison of FIG. 5 would not be obtained if the expanding parison initially contacted mold walls 22 and ceased to expand in that area since the portion of the parison along that wall would be almost as thick as the initial parison, whereas the portion of the parison at the furthermost walls 26 would be thinned out to an unacceptable extent.

Figure 6:
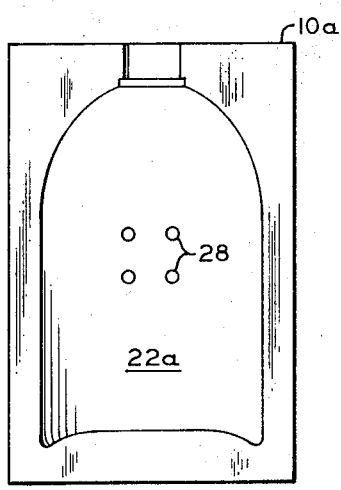
FIG. 6 is a view of an alternative means for providing the air bearing.

FIG. 6 shows another means of obtaining a gaseous fluid lubricating bearing wherein mold half 10a has small holes 28 through which the gaseous fluid can be passed at a low rate of flow.

Figure 8:
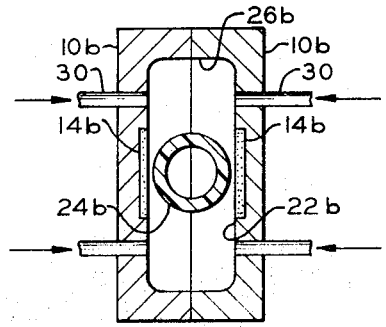
FIG. 8 is a view similar to FIG. 4 except with mold halves having the configuration shown in FIG. 7.
Figure 7:
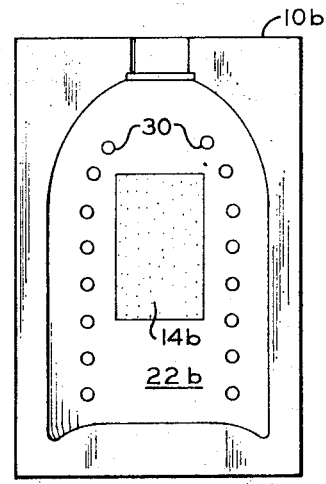
FIG. 7 is a view of a mold half in accordance with an alternative embodiment of the invention whereby a gaseous fluid jet can be employed in conjunction with a gaseous fluid bearing.

Referring now to FIG. 7, there is shown an alternative embodiment of the invention wherein mold half 10b has a porous metal insert plate 14b and in addition, has disposed along wall 22b two rows of conduits 30 for introducing a gaseous fluid jet. The rows of orifices are disposed in the wall in such a way as to provide an air curtain on either side of parison 24b as shown in FIG. 8. In this way, as parison 24b begins to expand, the portions expanding toward wall 26b at the end of the major axis will contact the gaseous fluid jet emanating from conduits 30 and will be cooled. This will make the rheological properties of the parison in this area more nearly like that of the portion of the parison which has contacted mold wall 22b so that as the parison continues to expand, material will be drawn from all portions thereof. If a gaseous fluid bearing is being utilized by means of introducing gaseous fluid through porous plate 14b, then the rheological properties of the parison will be such that material will be preferentially drawn from the portion of the parison adjacent mold wall 22b. This, coupled with the fact that the portion of the parison expanding toward mold wall 26b has much further to expand, gives the net result of a generally flat or oval blow molded hollow article having essentially identical wall thickness around its entire circumference.

It is readily apparent that many conventional parts such as temperature controllers, hydraulic cylinders, springs, and the like have been omitted from the drawings for the sake of simplicity but their inclusion is understood by those skilled in the art and is within the scope of the invention.

would pass air at a rate of about 2,000 cc./min./in.$^2$ at 20 p.s.i.g. The actual pressure used was 9.5 p.s.i.g. In some of the following runs, only the air bearing was used, in other runs, only the air jet was used, and in other runs, both the air bearing and air jet were used. Air was introduced through the air bearing immediately upon closing of the mold halves and continued until after the part was blown in instances where the air bearing was used. Where the air jet was used, the operation was timed so that the jets were operated at mold closure for about 0.1 second before the parison was blown, during the 0.25 second required for blowup of the parison and for a short time thereafter to give a total time of 0.85 second for the air jet operation. The following tabulation shows the thickness of the various bottles along the major and minor axes respectively at varying distances from the top of the bottle.

TABLE

| Run | Air bearing | Air jet | Distance from top, in. | | | | | | | | | |
|---|---|---|---|---|---|---|---|---|---|---|---|---|
| | | | 2⅛ | | 3⅛ | | 4⅛ | | 5⅛ | | 6⅛ | |
| | | | Bottle measurements, mils | | | | | | | | | |
| | | | Maj. | Minor | Maj. | Minor | Maj. | Minor | Maj. | Minor | Maj. | Minor |
| Control | No | No | 10 | 45 | 16 | 56.5 | 11.5 | 54 | 12 | 51 | 8 | 54 |
| 1 | Yes | No | 11.5 | 39.5 | 16 | 27 | 17 | 23.5 | 17.5 | 24 | 15 | 33.5 |
| 2 | No | Yes | 11 | 40 | 15.5 | 48.5 | 12 | 46 | 11.5 | 41.5 | 16.5 | 36.5 |
| 3 | Yes | Yes | 12 | 38 | 15 | 21 | 13.5 | 17.5 | 12.5 | 19.5 | 14.5 | 28 |

EXAMPLE

Propylene homopolymer having a density of 0.905 (ASTM D 1505–63T), and a melt flow of 2 (ASTM D 1238–62T, Condition L), and a melting point of about 340° F. was extruded into tubing having an outside diameter of 1.125 inches and a wall thickness of 0.125 inch. The tubing was then cooled to room temperature and cut into five-inch lengths. Thereafter, the tubing was heated for 7 minutes in an aluminum heating cylinder to a nominal temperature of 327° F. The parisons were then placed in a molding apparatus similar to that shown in the Turner et. al. reference referred to hereinabove with a mold similar to that shown in FIGS. 7–8 for blow molding a generally oval bottle approximately 3½ inches wide by 1⅜ inches thick by 7½ inches high, including the threaded neck portion, with a major to minor axis ratio of 2.4:1 near the top shoulder, 2.7:1 near the center of the side wall, and 2.4:1 near the bottom. Porous panels approximately 2¼ inches wide by 3½ inches high were provided in each mold half centered on the walls at the ends of the minor axis, as shown in FIGS. 7 and 8. The parting line of the mold was along the major axis; shims were provided at each corner between the mold parts so as to allow a vent space around part of the parting line. Two vertical rows of 0.135-inch diameter air jet holes were present in each mold half, the rows being approximately ¾ inch each side of the mold cavity vertical centerline. Each vertical row had 6 holes equally spaced ¾ of an inch apart as shown in FIG. 7. Air was supplied to said orifices under a pressure of 120 p.s.i.g. Each mold half also had a porous plate having a porosity such that they Run 1 compared with the control shows that the use of the air bearing results in greater uniformity of wall thickness, in most cases, as the result of both the wall along the ends of the major axis being thicker and the wall along the ends of the minor axis being thinner. Run 2 shows a similar advantage for the air jet. Run 3 shows that the combination of the two gives even more uniform wall thickness, primarily as a result of further decreasing the thickness of the wall along the minor axis.

While this invention has been described in detail for the purpose of illustration, it is not to be construed as limited thereby, but is intended to cover all changes and modifications within the spirit and scope thereof.

I claim:
1. A process for forming an irregularly shaped hollow article comprising:
   positioning a tabular parison in a mold zone;
   introducing fluid pressure into the interior of said parison;
   producing a thin film of a gaseous fluid along the portion of the forming surface of said mold which the expanding parison first approaches; and
   supplying at least one jet stream of gaseous fluid along a side of and spaced a short distance away from said parison, said jet thus being disposed so that said jet of gaseous fluid first contacts said parison on a portion of said parison which has expanded toward a wall at the end of a major axis of said mold zone.
2. A method according to claim 1 wherein said gaseous fluid is nitrogen.
3. A method according to claim 1 wherein said gaseous fluid is air.
4. A method according to claim 1 wherein said film is produced by passing said fluid through said mold wall at a rate within the range of 400–10,000 cc./min./in.$^2$ with a pressure drop across a mold wall comprising said portion of said forming surface of 5–100 p.s.i.
5. A method according to claim 1 wherein said tubular parison is in the form of a preform which is heated in the solid state to a temperaure of 1–50° F. below the crystalline melting point of the thermoplastic material comprising said parison prior to introduction into said mold cavity.
6. A method according to claim 5 wherein said parison is formed of a polymer of at least one mono-1-olefin having 2–8 carbon atoms per molecule.

7. A method according to claim 5 wherein said parison comprises polypropylene.

8. A method according to claim 1 wherein a plurality of jet streams are provided in a row along each side of said parison.

9. A method according to claim 8 wherein said gaseous fluid issues from said mold at a viscosity within the range of 50 ft./sec. up to acoustic velocity.

10. A process for blow molding an irregularly shaped hollow article comprising:
   positioning a tubular parison in a mold zone;
   introducing fluid pressure into the interior of said parison; and
   supplying at least one jet stream of gaseous fluid along a side of and spaced a short distance away from, said parison, said jet thus being disposed so that said jet of gaseous fluid first contacts said parison on a portion of said parison which has expanded toward a wall at the end of a major axis of said mold zone.

11. The mold according to claim 10 wherein there is provided a plurality of jet streams along two rows, one on each side of said parison.

12. The method according to claim 10 wherein said gaseous fluid issued from said mold wall at a velocity within the range of 50 ft./sec. up to acoustic velocity.

References Cited

UNITED STATES PATENTS

| | | | |
|---|---|---|---|
| 3,125,619 | 3/1934 | Miller | 264—98 |
| 3,115,677 | 12/1963 | Thiel | 264—92 |
| 3,390,426 | 7/1968 | Turner et al. | 264—98 X |
| 2,336,822 | 12/1943 | Wadman | 264—94 UX |
| 2,973,558 | 3/1961 | Stratton, Jr. | 264—89 UX |
| 3,496,258 | 2/1970 | Wiley | 264—98 X |

FOREIGN PATENTS

| | | | |
|---|---|---|---|
| 96,114 | 6/1964 | Great Britain | 18—19 F |
| 1,171,597 | 6/1964 | Germany | 264—92 |

ROBERT F. WHITE, Primary Examiner

J. H. SILBAUGH, Assistant Examiner

U.S. Cl. X.R.

18—5 BH; 264—89, 98, 327